Oct. 30, 1934.     H. L. STEEL     1,978,968
CORN HARVESTER
Original Filed July 3, 1933    3 Sheets-Sheet 1
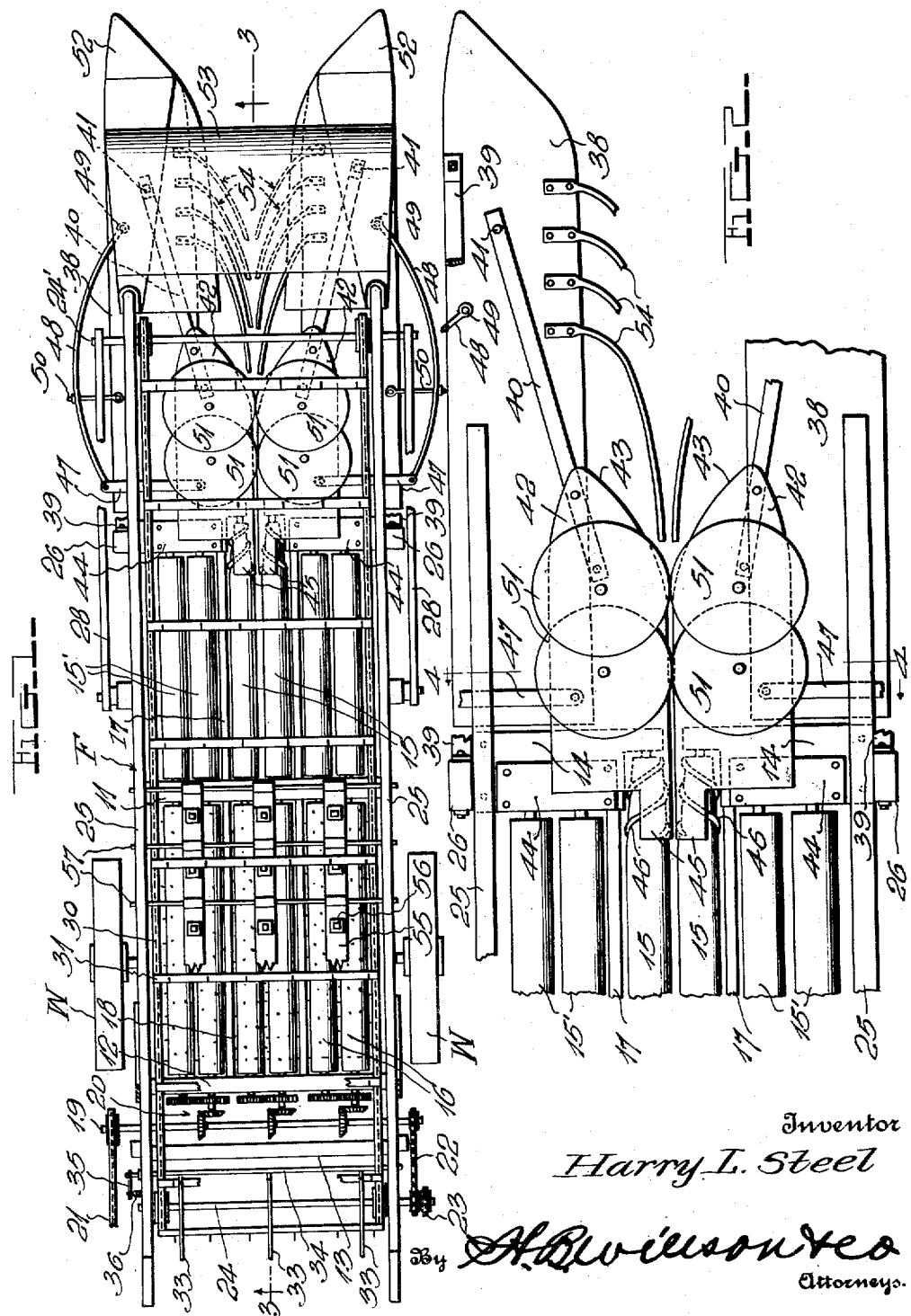
Inventor
Harry L. Steel
By H. L. Wilson &co
Attorneys.

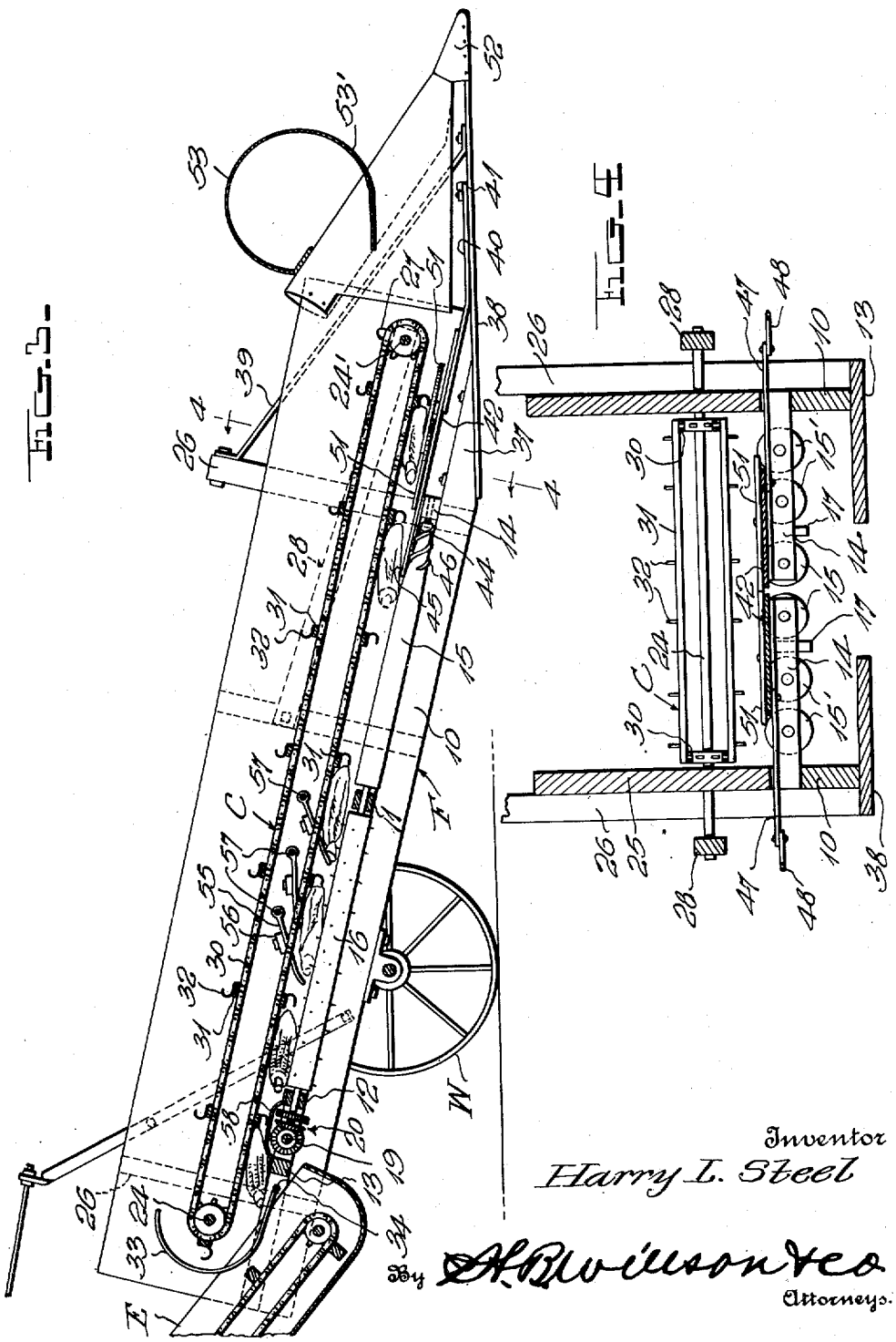

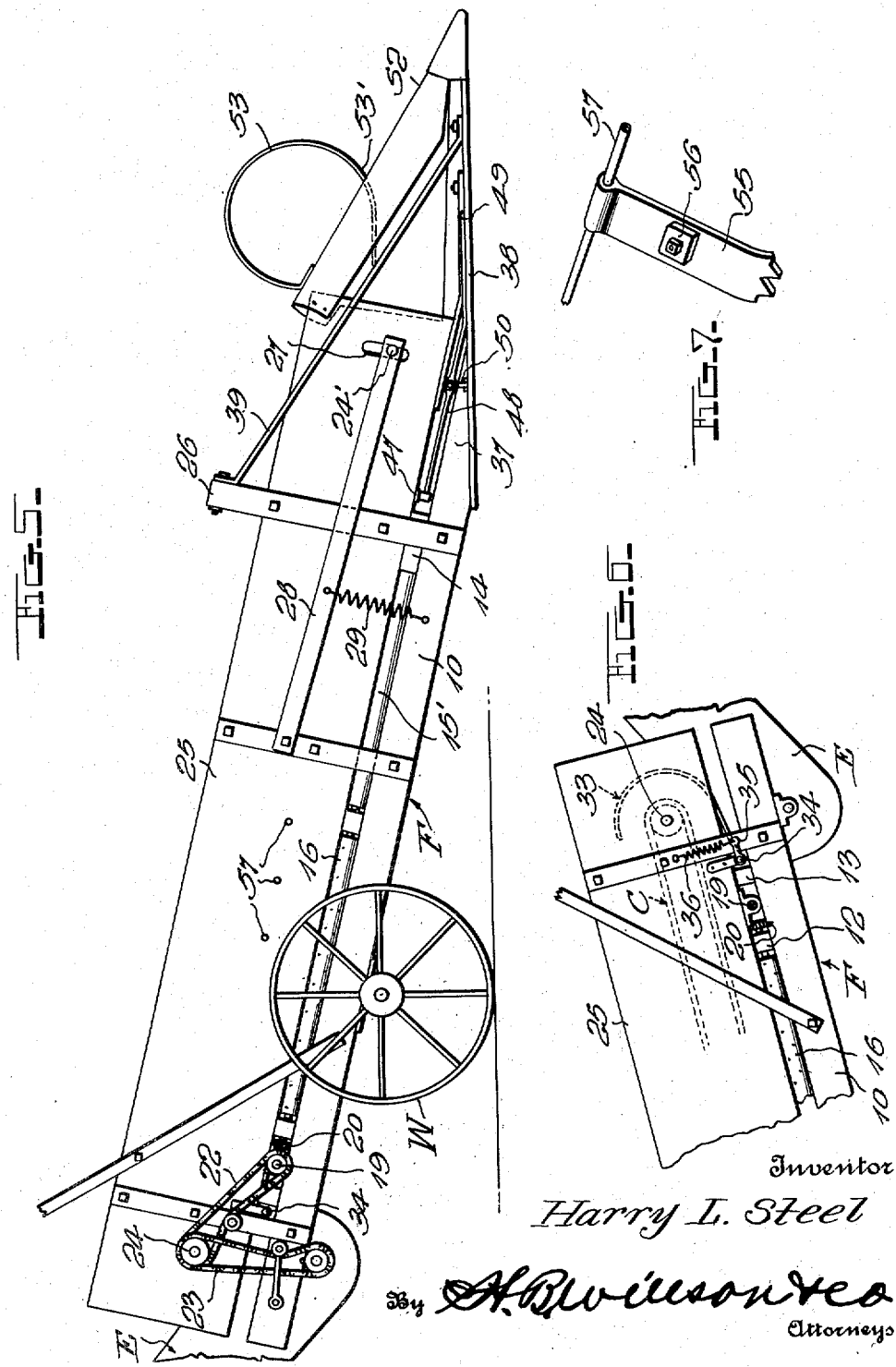

Patented Oct. 30, 1934

1,978,968

UNITED STATES PATENT OFFICE 1,978,968

CORN HARVESTER

Harry L. Steel, La Fayette, Ind., assignor of three-tenths to Phillip A. Russell and two-tenths to Frederick O. Evans, trustees, both of La Fayette, Ind.

Application July 3, 1933, Serial No. 678,943
Renewed June 12, 1934

11 Claims. (Cl. 56—104)

The invention relates to an improved corn harvester which straddles the corn to be harvested, forwardly tilts and depresses the same and slides along the depressed stalks until the ears are encountered, snaps the ears from the stalks, forces the latter down under the machine, husks the ears, and discharges them into a wagon or the like. An endless conveyor drags the ears along snapping and husking rolls to an elevator which discharges them into the wagon or the like, and this conveyor necessarily carries with it any broken stalks, leaves, husks, and trash which are not carried between the rolls and discharged onto the ground, and one of the most important objects of the invention is to provide for returning such broken stalks, etc. onto said rolls, so that these rolls may again act on said stalks, etc. and may downwardly roll them onto the ground, preventing any appreciable quantity thereof from discharging with the husked corn.

Further objects are to provide novel means for guiding the corn into the machine even though a great deal of it may be severely inclined or lying substantially upon the ground; to provide novel means for snapping the ears from the stalks; to make unique provision for preventing the ears from reaching and being crushed by stalk-engaging screws on the front ends of the snapping rolls; to provide novel means for holding the ears down upon the husking rolls; and to provide a comparatively simple and inexpensive, yet an efficient and rapid machine which does not handle the entire stalk but handles only the portion thereof from the ear to the tip. The machine is intended primarily to be driven by and disposed at one side of a tractor which pulls the corn-receiving wagon or the like and the machine is so constructed that the driver of the tractor may have such clear visibility as to enable him to properly steer along the row or rows being harvested.

With the foregoing in view, the invention resides in the novel subject matter hereinafter described and claimed, description being accomplished by reference to the accompanying drawings.

Fig. 1 is a top plan view, parts being removed and other parts broken away.

Fig. 2 is an enlarged fragmentary top plan view of the front end of the machine, the various fenders being removed and other parts being broken away.

Fig. 3 is a central vertical longitudinal sectional view on line 3—3 of Fig. 1.

Fig. 4 is a vertical transverse section on line 4—4 of Figs. 2 and 3.

Fig. 5 is a side elevation.

Fig. 6 is a fragmentary elevation of a portion of the opposite side of the machine.

Fig. 7 is a perspective view of one of the pivoted fingers which holds the ears down upon the husking rolls.

The specific construction herein disclosed will be described, with the understanding however that numerous variations may be made within the scope of the invention as claimed.

The machine embodies a rearwardly inclined frame F mounted upon wheels W, and adapted to be disposed at one side of a tractor (not shown) to be driven by the latter. The rear end of the frame is provided with an appropriate elevator E for elevating the husked corn and discharging it into a wagon (not shown) drawn by the tractor.

The frame F includes two longitudinal side bars 10 connected between their ends by a transverse bar 11, and connected near their rear ends by other transverse bars 12 and 13. Near the front ends of the bars 10, rigid supports 14 project inwardly from said bars. These supports 14 support the front ends of a central pair of snapping rolls 15 and two laterally spaced pairs of similar rolls 15', the rear ends of said rolls 15 and 15' being supported by the bar 11. This bar 11 also supports the front ends of three pairs of husking rolls 16, these rolls 16 being connected with the rolls 15 and 15' to rotate bodily therewith. Longitudinal dividers 17 carried by the supports 14 and the bar 11, extend between the pairs of rolls 15 and 15', and other dividers 18 carried by the bars 11 and 12, extend between the central pair of rolls 16 and the laterally spaced pairs of these rolls.

Extending between the bars 12 and 13 is a transverse shaft 19 which is operatively connected by appropriate gearing 20 with the rear ends of the rolls 16, a chain 21 being shown at one end of said shaft to be driven by the tractor. The other end of the shaft drives appropriate operating connections 22—23, for the elevator E and an endless openwork conveyor C which extends longitudinally over the various rolls above described. The front and rear shafts of this conveyor are denoted at 24 and 24' respectively, shaft 24 being supported by appropriate bearings carried by two longitudinal side walls 25 which are disposed above the side bars 10 and secured to posts 26 rising from said side bars. The shaft 24' however, passes through slots 27 in the walls 25 and is carried by pivotally mounted arms 28 which may if desired be urged downwardly by coiled springs 29.

The conveyor C is of openwork form and in the present disclosure, consists of two side chains 30 connected by transverse slats 31, said slats having hooks 32 for dragging the ears of corn along the rolls 15 and 16. Most of the broken stalks and trash deposited upon the rolls, are discharged between said rolls onto the ground, but some of such stalks and trash are carried as far as the elevator E by the conveyor C. They are prevented however from being discharged into said elevator and are directed onto the upper reach of said conveyor C, by a plurality of U-shaped fingers 33. The lower ends of these fingers extend under the upper end of the conveyor C and extend over the corn-receiving end of the elevator E, the intermediate portions of said fingers extend upwardly behind the conveyor C, and the upper ends of said fingers extend forwardly over the rear end of said conveyor. The fingers 33 are spaced sufficiently to readily allow the ears of corn to fall between them into the elevator, but said fingers catch most of the broken stalks and trash and direct them onto the forwardly traveling upper reach of the conveyor C. This conveyor reach carries the trash and the broken stalks forwardly and as the conveyor is of openwork form, said stalks and trash may fall through said conveyor onto the rolls 16, 15 and 15', so that these rolls may act to roll the stalks and trash downwardly onto the ground.

The lower ends of the fingers 33 are secured to a transverse rock shaft 34 having a crank arm 35 at one end (Fig. 6), and a spring 36 is connected to this crank arm, said spring tending to turn said shaft in a direction to swing the fingers 33 upwardly, so that they will tightly hold broken stalks and the like against the slats 31.

The side bars 10 are provided with beveled front ends 37 to the lower edges of which are secured two horizontal forwardly projecting arms 38 which are preferably of flat form. Inclined braces 39 are secured to the front ends of these arms 38 and to the foremost of the posts 26. Two laterally swingable arms 40 overlie the fixed arms 38 and the front ends of said arms 40 are pivoted at 41 to said fixed arms 38. The rear ends of the arms 40 are secured to a pair of longitudinally extending plates 42 having diverging front ends 43 to guide the corn stalks between them. The rear ends of these plates lie slidably upon wear-plates 44 secured upon the supports 14, and said rear ends of said plates are provided with rearward projections 45 overlying the usual stalk-engaging screws 46 on the front ends of the snapping rolls 15, said projections 45 preventing the ears from reaching and being crushed by said screws. The stalks pass between the adjacent inner edges of the plates 42, and these plates may laterally move as required. In the present showing, transverse links 47 are pivoted to the plates 42 at their inner ends and are pivoted at their outer ends to longitudinal springs 48. The front ends of these springs are mounted at 49 upon the fixed arms 38, and spring-tensioning devices 50 connect intermediate portions of said springs with said arms 38. By adjusting these devices 50, the effective strength of the springs 48 may be varied to press the plates 42 toward each other with the desired amount of force.

Flat disks 51 are preferably rotatably mounted upon the plates 42 to engage the corn stalks passing between said plates. These disks may rotate with sufficient freedom to allow their rotation to be effected by contact with the stalks of corn, so that the points of contact between stalks and disks are constantly changing and there will be no localizing of wear upon the disks.

The arms 38 are pointed at their front ends and are provided with similarly pointed fenders 52 having inclined upper portions, the rear ends of said fenders being secured to the walls 25. These fenders serve to substantially erect laterally tilted stalks of corn. A transverse fender 53 extends between the upper portions of the fenders 52 and is provided with an upwardly curved front portion 53'. This fender 53 serves to forwardly tilt and depress the stalks of the row so that said stalks in depressed inclined positions, will be encountered by the plates 42 and disks 51. Guide fingers 54 which are secured to and extend inwardly and rearwardly from the fixed arms 38, guide the stalks from the fender 53 to the plates 43 and disks 51 and assist also in picking up fallen stalks.

As the forwardly depressed stalks encounter the disks 51 and pass on between these disks and the plates 42, any ears sufficiently low to be encountered by these parts, may be snapped from the stalks, the ears being immediately engaged by the conveyor C and carried on rearwardly. Ears not snapped off in this manner, are snapped from the stalks by the snapping rolls 15, the ears being rearwardly carried by the conveyor C. All stalks entering between the rolls 15, are promptly rolled downward onto the ground by these rolls, unless some pieces of stalks be broken. Broken stalks and trash received upon the rolls 15 and 15', are to a large extent promptly rolled downward between these rolls, and any of such broken stalks and trash carried rearwardly by the conveyor C over the husking rolls 16, may to a large extent be downwardly rolled between these husking rolls onto the ground. Any of the debris not so disposed of, is carried on rearward by the conveyor C and by the fingers 33, is directed onto the forwardly moving upper reach of said conveyor. Consequently, such debris may fall through the openwork conveyor onto the rolls 16, 15 and 15' and said rolls may again act upon said debris, tending again to downwardly discharge it onto the ground. It is thus insured that very little trash and the like shall be discharged with the husked corn. The husks are removed in the usual way by the husking rolls 16 and by the time the ears reach the elevator E, they are completely husked. It is of course essential that the ears be properly held down against the husking rolls 16, and for this purpose, I employ a plurality of pivoted hold-down fingers 55. These fingers are of sufficient weight to properly hold the ears down, unless the husks be unusually dry, at which time it may be necessary to bolt weights 56 upon said fingers. The fingers 56 are loosely mounted at their upper ends upon transverse rods 57 carried by the side walls 25, said rods extending between the upper and lower reaches of the conveyor C. The conveyor slats 31 must, of course, travel under the fingers 55, but the inclination of the latter is such that this readily permitted.

An appropriate shield 58 (Fig. 3) of course extends over the shaft 19 and the gearing 20 to prevent ears of corn, husks, broken stalks, etc. from falling into said gearing. This shield is omitted from Fig. 1 to show the parts beneath it.

Excellent results are obtainable from the general structure shown and described and it may therefore be followed if desired. However, within the scope of the invention as claimed, variations may be made as above stated.

I claim:—

1. A corn harvester comprising a rearwardly inclined portable frame, ear-snapping and husking rolls on said frame, means at the front end of the frame for directing stalks of corn between two of said snapping rolls, an openwork ear conveyor extending longitudinally over said snapping and husking rolls, said conveyor having a rearwardly traveling lower reach for dragging the ears of corn along said rolls, and having a forwardly traveling upper reach, means at the rear end of said conveyor for receiving trash and broken stalks from said lower conveyor reach and directing them onto said upper reach, whereby said trash and broken stalks will be carried forwardly and may drop through the conveyor onto said rolls to be rolled between the latter onto the ground, and driving means for said conveyor and said rolls.

2. A corn harvester comprising a rearwardly inclined portable frame, ear-snapping and husking rolls on said frame, means at the front end of the frame for directing stalks of corn between two of said snapping rolls, an openwork ear conveyor extending longitudinally over said snapping and husking rolls, said conveyor having a rearwardly traveling lower reach for dragging the ears of corn along said rolls, and having a forwardly traveling upper reach, substantially C-shaped laterally spaced fingers stationarily mounted on said frame and each extending under, in rear of and over the rear end of said conveyor, said fingers being adapted to receive broken stalks and trash from said lower conveyor reach and to direct them onto said upper reach, whereby said broken stalks and trash will be carried forwardly and may drop through the conveyor onto said rolls to be rolled between the latter onto the ground, and driving means for said rolls and said conveyor.

3. A corn harvester comprising a rearwardly inclined portable frame, ear-snapping and husking rolls on said frame, means at the front end of the frame for directing stalks of corn between two of said snapping rolls, an openwork ear conveyor extending longitudinally over said snapping and husking rolls, said conveyor having a rearwardly traveling lower reach for dragging the ears of corn along said rolls, and having a forwardly traveling upper reach, substantially C-shaped laterally spaced fingers each extending under, in rear of and over the rear end of said conveyor, said fingers being adapted to receive broken stalks and trash from said lower conveyor reach and to direct them onto said upper reach, whereby said broken stalks and trash will be carried forwardly and may drop through the conveyor onto said rolls to be rolled between the latter onto the ground, a transverse rock shaft secured to and carrying the lower ends of said fingers, said rock shaft being mounted on said frame, means tending to turn said rock shaft in a direction to upwardly swing said fingers, and driving means for said conveyor and said rolls.

4. In a corn harvester, a portable frame provided with a pair of forwardly projecting fixed arms to straddle a row of corn, pointed fenders carried by said arms and having rearwardly inclined upper portions to erect stalks tilted laterally from the row, a third fender extending between said upper portions of the first named fenders and having an upwardly curved front portion to forwardly tilt all stalks straddled by the machine, and means for snapping the ears from the forwardly tilted stalks.

5. In a corn harvester, a portable frame provided with a pair of forwardly projecting fixed arms to straddle a row of corn, pointed fenders carried by said arms and having rearwardly inclined upper portions to erect stalks tilted laterally from the row, fingers secured to said arms and extending inwardly and rearwardly therefrom to pick up fallen stalks, a third fender extending between said upper portions of the first named fenders and having an upwardly curved front portion to forwardly tilt all stalks straddled by the machine, and means for snapping the ears from the forwardly tilted stalks.

6. In a corn harvester, a portable frame having two fixed forwardly projecting arms disposed in a substantially horizontal plane and laterally spaced to straddle a row of corn, two longitudinally extending swingable arms over said fixed arms, the front ends of said swingable arms being pivoted to said fixed arms to allow swinging of said swingable arms toward and from each other, two ear-snapping plates disposed edge to edge in a rearwardly inclined plane and connected with the rear ends of said swingable arms, and spring means mounted on said fixed arms for forcing the swingable arms toward each other.

7. In a corn harvester, a portable frame having two fixed forwardly projecting arms disposed in a substantially horizontal plane and laterally spaced to straddle a row of corn, two longitudinally extending swingable arms over said fixed arms, the front ends of said swingable arms being pivoted to said fixed arms to allow swinging of said swingable arms toward and from each other, two ear-snapping plates disposed edge to edge in a rearwardly inclined plane and connected with the rear ends of said swingable arms, longitudinally extending springs spaced laterally outward from said ear-snapping plates and having their front ends mounted on said stationary arms, links connecting the rear ends of said springs to said plates, and spring tensioning devices connecting intermediate portions of said springs with said stationary arms.

8. In a corn harvester, a portable frame, two disks disposed edge to edge in a common plane and adapted to straddle a row of corn to snap the ears from the stalks, supports upon which said disks are rotatably mounted, and yieldable means for moving said supports toward each other, said disks being rotatable with sufficient freedom to allow the stalks to rotate them.

9. In a corn harvester, a portable frame, two plates disposed edge to edge and adapted to straddle a row of corn, means for movably mounting said plates on said frame, means for forcing said plates yieldably toward each other, and flat disks rotatably mounted upon said plates and having their edges disposed at the inner edges of said plates for contact with the stalks to snap the ears from said stalks, said disks being rotatable with sufficient freedom to allow the stalks to rotate them.

10. In a corn harvester, a portable frame, a pair of stalk-straddling ear-snapping rolls mounted on said frame and having stalk-engaging screws at their front ends, ear-snapping stalk-straddling plates disposed edge to edge in advance of said rolls and having rearward projections overlying said screws to prevent the ears from reaching the latter, means mounting said plates on the frame for movement toward and from each other, and yieldable means for moving said plates toward each other.

11. In a corn harvester, ear handling rolls, an endless conveyor for moving the ears along said rolls, said conveyor comprising side chains and transverse slats secured to said chains, and inclined gravity-lowered fingers pivoted at their upper ends between the two reaches of said conveyor, said fingers hanging downwardly between said slats to hold the ears down upon said rolls.

HARRY L. STEEL.

CERTIFICATE OF CORRECTION.

Patent No. 1,978,968.            October 30, 1934.

HARRY L. STEEL.

It is hereby certified that error appears in the above numbered patent requiring correction as follows: In the grant, line 3, for the word "Trustees" read Trustee; lines 13 and 14, strike out "Harry L. Steel, his heirs or assigns, and Phillip A. Russell and Frederick O. Evans, as Trustees, their successors or assigns" and insert instead Harry L. Steel and Phillip A. Russell, their heirs or assigns, and Frederick O. Evans, as Trustee, his successors or assigns; and that the said Letters Patent should be read with this correction therein that the same may conform to the record of the case in the Patent Office.

Signed and sealed this 31st day of October, A. D. 1939.

(Seal)
           Henry Van Arsdale,
           Acting Commissioner of Patents.

advance of said rolls and having rearward projections overlying said screws to prevent the ears from reaching the latter, means mounting said plates on the frame for movement toward and from each other, and yieldable means for moving said plates toward each other.

11. In a corn harvester, ear handling rolls, an endless conveyor for moving the ears along said rolls, said conveyor comprising side chains and transverse slats secured to said chains, and inclined gravity-lowered fingers pivoted at their upper ends between the two reaches of said conveyor, said fingers hanging downwardly between said slats to hold the ears down upon said rolls.

HARRY L. STEEL.

CERTIFICATE OF CORRECTION.

Patent No. 1,978,968. October 30, 1934.

HARRY L. STEEL.

It is hereby certified that error appears in the above numbered patent requiring correction as follows: In the grant, line 3, for the word "Trustees" read Trustee; lines 13 and 14, strike out "Harry L. Steel, his heirs or assigns, and Phillip A. Russell and Frederick O. Evans, as Trustees, their successors or assigns" and insert instead Harry L. Steel and Phillip A. Russell, their heirs or assigns, and Frederick O. Evans, as Trustee, his successors or assigns; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.